United States Patent
Curran et al.

(12) 
(10) Patent No.: US 6,567,071 B1
(45) Date of Patent: May 20, 2003

(54) POSTITIONING SYSTEM USING INFRARED RADIATION

(76) Inventors: Kenneth J. Curran, 2829 Rikkard Dr., Thousand Oaks, CA (US) 91362; Jay Smith, III, 348 Bentel Ave., Los Angeles, CA (US) 90049

( * ) Notice: Subject to any disclaimer, the term of this patent is extended or adjusted under 35 U.S.C. 154(b) by 0 days.

(21) Appl. No.: 09/134,585

(22) Filed: Aug. 14, 1998

Related U.S. Application Data (62) Division of application No. 08/291,196, filed on Aug. 16, 1994, now Pat. No. 5,796,387.

(51) Int. Cl.[7] ............................................. G09G 5/08
(52) U.S. Cl. ..................... 345/158; 345/156; 345/169
(58) Field of Search .................. 345/158, 169, 345/157, 161, 156; 348/734; 273/348, 317; 463/37, 39

(56) References Cited

U.S. PATENT DOCUMENTS

| | | | | | |
|---|---|---|---|---|---|
| 4,924,216 | A | * | 5/1990 | Leung | 340/709 |
| 4,988,981 | A | * | 1/1991 | Zimmerman et al. | 340/709 |
| 5,162,781 | A | * | 11/1992 | Cambridge | 340/710 |
| 5,363,120 | A | * | 11/1994 | Drumn | 345/158 |
| 5,435,573 | A | * | 7/1995 | Oakford | 273/438 |
| 5,528,287 | A | * | 6/1996 | Stern | 348/25 |
| 5,574,479 | A | * | 11/1996 | Odell | 345/158 |
| 5,949,064 | A | * | 9/1999 | Chow et al. | 250/214 LS |
| 5,982,352 | A | * | 11/1999 | Pryor | 345/156 |

* cited by examiner

Primary Examiner—Vijay Shankar (57) ABSTRACT

A positioning controller having a receiving side for receiving light from a light source is disclosed. The receiving side includes an axis extending perpendicularly therefrom, and a vertical plane and a horizontal plane intersecting at the axis. The positioning controller includes three sensors. The reference sensor is positioned between the other two sensors, and is masked to receive light within a predetermined range of acute angles measured from the axis. One of the other two sensors is a vertical angle sensor that is masked to receive a larger quantity of light from a first side of the horizontal plane and from a second side of the horizontal plane. The third sensor is a horizontal angle sensor that is masked to receive a larger quantity of light from a first side of the vertical plane than from a second side of the vertical plane. The positioning controller further includes circuitry for determining an orientation of the positioning controller using the amounts of light received by the reference sensor, the vertical angle sensor, and the horizontal angle sensor.

34 Claims, 5 Drawing Sheets

FIG. 4c $\cos \alpha = \frac{b}{c}$
$b = c \cos \alpha$

POSITIONING SYSTEM USING INFRARED RADIATION

This is a division of U.S. Ser. No. 08/291,196, filed on Aug. 16, 1994, issued on Aug. 18, 1998, now U.S. Pat. 5,796,387.

BACKGROUND OF THE INVENTION

1. Field of the Invention

The present invention relates to electronic gaming systems and, more specifically, to hand-held positioning controllers or control pads used with a display and an infrared positioning system.

2. Description of Related Art

Most microprocessor-controlled gaming systems use joysticks, control pads, or other pointing systems to allow the user to input data to the microprocessor while playing a game. Two popular gaming systems are the Genesis system, which is manufactured by Sega Enterprises Ltd., and Nintendo Super NES, which is manufactured by Nintendo. Both systems include, as an accessory, a positioning controller which the user holds while playing a game. When the positioning controller is pointed up, a displayed object moves up, and the object similarly moves when the positioning controller is pointed down, left, and right.

One prior art approach to positioning the cursor on the screen in response to the position of the positioning controller is dependent on the television screen size and brightness. The positioning controller of this prior art approach focuses on an area of the television screen and detects when the television raster scan passes through this area. The timing of the detection is then used to determine the position on the screen where the positioning controller is focused. This approach thus uses the television screen as a source for determining position. In so doing, the approach is screen dependent, and position data can vary based on color and intensity of the screen.

This prior art approach additionally has an angular sensitivity that is dependent upon screen size and distance from the screen. For example, the angle between the positioning controller and an area on the screen may be 5 degrees at 5 feet from the television screen and much smaller at 20 feet from the screen. Thus, a user rotating the positioning controller to place a displayed curser in an upper portion of the screen must rotate the positioning controller more when sitting near the television and less when sitting further away from the television. This angular sensitivity can render positioning of the sensor difficult when the user is positioned far away from the screen. Moreover, a user must adapt to different sensitivities every time the positioning controller is used at a different distance from the television.

Further, cursor position jitter can be high with this prior art approach, and the accompanying averaging algorithm used to stabilize the varying data is often less than optimal. This averaging causes significant artifacts to be visible when the cursor is moved. Thus, a need exists in the prior art for a positioning apparatus that is both convenient and accurate.

OBJECTS AND SUMMARY OF THE INVENTION

The present invention resolves the above-mentioned shortcomings with a positioning apparatus which uses infrared light for generating positioning data. An infrared beacon is placed near the television, and a positioning controller having an infrared sensor derives positioning data from reception of infrared light from the beacon. The present invention measures the angle of the controller relative to the beacon.

The positioning controller of the presently preferred embodiment is held by a user during operation of games run by a microprocessor. By changing the pitch of the positioning controller, a user can move a displayed object up and down. Also, by changing the yaw of the positioning controller, the user can cause the cursor to move left and right on the screen. The movement of the cursor on the screen roughly corresponds to the angular movement of the positioning controller held by the user.

If the present invention is set for a full scale at 20 degrees, the full scale will be the same whether the positioning controller is 1 foot or 100 feet away from the beacon. The angle for full scale can thus be set so that rotation of the positioning controller to the set angle results in the cursor being positioned at an edge of the television screen. According to the present invention, a user can rotate the positioning controller the same amount for the same displayed cursor movement, regardless of the distance between the user and the television. The present invention operates independently of screen color, brightness, and size.

A preferred embodiment of the present invention includes a positioning controller having a receiving side for receiving light from a light source. The receiving side includes an axis extending perpendicularly therefrom, and a vertical plane and a horizontal plane intersecting at the axis. The positioning controller includes three sensors. The reference sensor is positioned between the other two sensors, and is masked to receive light from a predetermined range of acute angles measured from the axis. One of the other two sensors is a vertical angle sensor that is masked to receive a larger quantity of light from a first side of the horizontal plane and from a second side of the horizontal plane. The third sensor is a horizontal angle sensor that is masked to receive a larger quantity of light from a first side of the vertical plane than from a second side of the vertical plane. The positioning controller further includes circuitry for determining an orientation of the positioning controller using the amounts of light received by the reference sensor, the vertical angle sensor, and the horizontal angle sensor.

According to the presently preferred embodiment, the lower half of the vertical angle sensor is masked so that reception of light into the vertical angle sensor is limited when the vertical angle sensor is pointed above the light source, and the reception of light into the vertical angle sensor is promoted when the vertical angle sensor is pointed below the light source. Similarly, the right half of the horizontal angle sensor is masked so that reception of light into the horizontal angle sensor is limited when the horizontal angle sensor is pointed to the left of the light source, and the reception of light into the horizontal angle sensor is promoted when the horizontal angle sensor is pointed to the right of the light source. By looking at the differential amounts of light received by the horizontal angle sensor and the vertical angle sensor, and comparing these amounts to the amount of light received by the reference sensor, orientation data describing the pitch and the yaw of the pointing device can be determined.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art.

Figure 1:
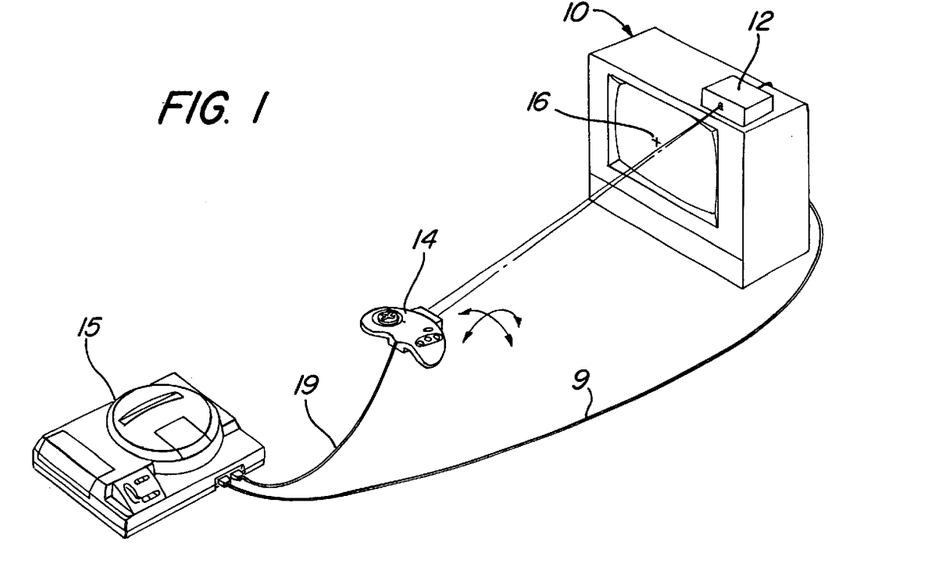
FIG. 1 is a perspective view of the positioning controller connected to a gaming device, and a television having a cursor displayed thereon.

Turning to FIG. 1, the positioning controller 14 is shown connected to a gaming system 15. A line 9 connects the gaming system 15 to the television 10, and allows the gaming system 15 to communicate images and sounds to the television 10. A line 19 connects the positioning controller 14 to the gaming system 15. Alternatively, the line 19 can be replaced with an infrared light communication path. Although the presently preferred embodiment is described having an infrared beacon 12 placed near the television 10, the infrared beacon can be configured as part of the gaming system and the combination placed near the television 10. One of the images communicated by the gaming system 15 is an object 16. The object 16 is shown in FIG. 1 as a cursor.

The positioning controller 14 can be held by a user and moved to change the position of the displayed cursor 16. Thus, when a user changes the pitch of the positioning controller 14, the cursor changes position vertically, and when the user changes the yaw of the positioning controller 14, the cursor changes position horizontally. Thus, the displayed cursor can be moved about on the screen by changing the angular orientation of the positioning controller 14.

Figure 3:
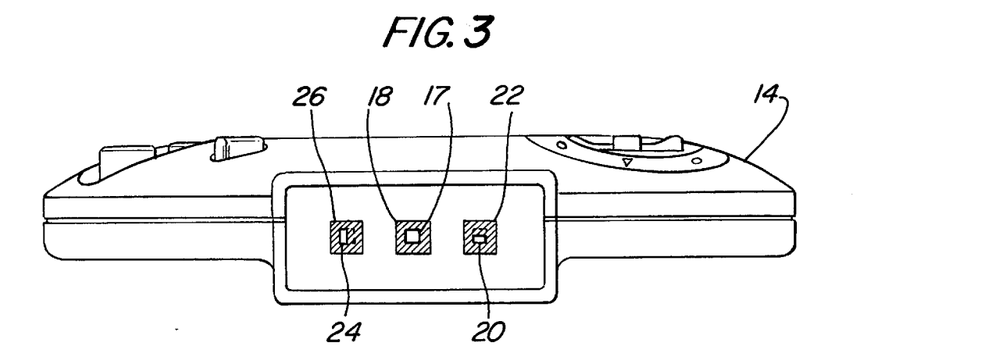
FIG. 3 is a front elevational view of the positioning controller according to the presently preferred embodiment.

During operation, the positioning controller 14 is pointed toward the beacon 12 (FIG. 1). In the presently preferred embodiment, the beacon 12 includes light-emitting diodes (LEDs) which emit infrared light. The positioning controller 14 includes three photodiodes on a receiving side of the positioning controller 14. A reference mask 18 is positioned above the reference sensor 17. The reference mask 18 permits reception of light by the sensor 17 within a predetermined range of acute ranges measured from a line perpendicular to the reference sensor 17. A vertical angle sensor 20 is masked by a vertical angle mask 22. The vertical angle mask 22 permits the vertical angle sensor 20 to receive a larger quantity of light from light positioned below the exposed side of the sensor than from light positioned above the covered side of the sensor.

When a user rotates the positioning controller 14 within a horizontal plane, the horizontal angle sensor 24 receives varying amounts of light from the beacon 12. The amounts received by the horizontal angle sensor 24 vary from the amounts received by the reference sensor 17. For example, referring to FIG. 1, a user rotating the positioning controller 14 to the left causes more of the sensor 24 to be exposed to the beacon 12, and a higher and a greater amount of light energy is received into the sensor 24, relative to the reference sensor 17. That is, the relative amounts of light are unchanged with distance from the beacon 12. Similarly, when the user rotates the positioning controller 14 to the right in the horizontal plane, more of the horizontal angle sensor 24 is masked and the amount of light received thereto is decreased relative to the reference sensor 17.

When the positioning controller 14 is rotated up within a vertical plane, more light is received into the sensor 20 relative to the reference sensor 17, and when the positioning controller 14 is rotated down, the mask 22 comes between the infrared light and part of the vertical angle sensor 20 to reduce the amount of received light relative to the reference sensor 17. Accordingly, by measuring the relative amounts of light received by the horizontal angle sensor 24 and the vertical angle sensor 20, the pitch and yaw of the positioning controller 14 can be determined.

Because the pitch and yaw of the positioning controller 14 is measured relative to the light received from the beacon 12, the cursor 16 can be controlled independent of the television screen color, brightness, and size. Additionally, the range of movement required by positioning controller 14 to cause a similar range of movement by the cursor 16 does not change with distance from the television 10. The presently preferred embodiment utilizes a simple algorithm for generating and transmitting the position data from the positioning controller 14 to the gaming system 15. Each transmission of position data requires only 50 microseconds. Additionally, nine-bit resolution of the X and Y position data input to the gaming system 15 allows for precise positioning and software scaling of sensitivity.

Cursor position jitter is avoided by the present invention. The presently preferred embodiment does not incorporate an averaging algorithm, as does the prior art. Instead, the presently preferred embodiment uses a one-bit filter. When the signal-to-noise ratio is high, the only jitter that can result with the presently preferred embodiment is generated by the analog-to-digital conversion. This difference in data is, at most, equal to ±1 bit. The presently preferred one-bit filter does not change a subsequent item of data if it is within one bit of the previous item of data. If the full scale is configured to be 20 degrees, as mentioned above, then this angle will generate a binary word of nine ones, equal to 511 decimal when the positioning controller 14 is positioned at positive 20 degrees (full scale). When the positioning controller 14 is positioned at negative 20 degrees, the positioning controller 14 generates a word of nine zeros. Thus, a full-scale word of nine ones is generated when the maximum amount of infrared light is received, and a word of nine zeros is generated when the minimum amount of light is received. These nine-bit words are indicative of the angle of the positioning controller 14 relative to the beacon 12.

The angles corresponding to full scale can be set by the distance from the masks to the sensors and by the sizes of the masks covering the sensors.

A first nine-bit word is generated for the vertical angle of the positioning controller 14, and a second nine-bit word is generated for the horizontal angle of the positioning controller 14. Each of the two words has 512 resolution, since each word can represent decimal numbers ranging from 0 to 511. The two relative words indicating the angular orientation of the positioning controller 14 to the beacon are then converted to the X and Y format of the gaming system 15, in the presently preferred embodiment. The horizontal position is converted from the 0 to 511 scale to a scale of from 0 to 320, and the vertical position is converted from the 0 to 511 scale to a scale of from 0 to 220. The scaling is done in the gaming, so that the game programmer can adjust the sensitivity and overscan. The X and Y format information is then transmitted serially to the gaming system 15 via line 19.

A large scan area allows for easy cursor positioning when an orientation of the positioning controller 14 would place the cursor 16 off-screen. Taking the horizontal position, for example, the positioning controller 14 output can be scaled so that 256 from the controller 14 equals 160 on the screen. If the scale factor is 1, then numbers from the positioning controller 14 between 0 and 96 are off-screen to the left, and numbers greater than 416 are off-screen to the right, as presently preferred. The gaming software can then display an off-screen symbol, such as an arrow, showing the relative position. This "overscan" feature compensates for component tolerances, such as variations in the absolute responsitivity of the photodiodes.

Regarding the beacon 12, a single infrared light emitting diode would have approximately 50% power at approximately 20 degrees off-axis. Ideally, a source that radiates equal energy in all directions would be preferred. Such a configuration obviously cannot be obtained. The presently preferred embodiment uses four infrared light diodes to increase the 50% power angle from 20 degrees to 30 degrees. Each of the infrared light diodes is positioned at 20 degrees off-axis. Thus, two diodes are positioned at 20 degrees above and below the axis, respectively, and two diodes are positioned at 20 degrees to the left and right of the axis, respectively. This configuration gives a coverage with the power being 50% at ±30 degrees. Approximately 100% power is focused along the axis. In an alternative embodiment, additional diodes may be added to increase the 50% power angle.

The area of each sensor that is exposed to the source is determined using trigonometry. As the sensors are moved off-axis, the infrared light received decreases in amplitude and the area exposed to the beacon decreases. When a sensor is masked at 50% of its area at the midpoint of the sensor, as the angle changes in one direction, more of the sensor is exposed, and as the angle changes in the other direction, less of the sensor is exposed. The amount of light received by the reference sensor is determined by the cosine (cos) function, which gives the effective area that is exposed to the infrared light. The cos function is applied to all three sensors.

Figures 4A, 4B:
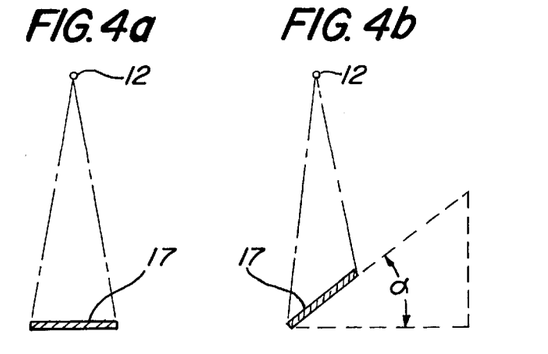
FIGS. 4a, 4b, and 4c are geometrical diagrams showing how amounts of received light are calculated for different orientations of the sensor relative to the beacon.

FIG. 4a shows a sensor positioned perpendicularly to the beacon 12. For illustrative purposes, the reference sensor 17 is shown, but the following applies to the horizontal angle sensor 24 and the vertical angle sensor 20 as well. The full area of the reference sensor 17 is exposed to the infrared light emitted by the beacon 12 in FIG. 4a. FIG. 4b shows the reference sensor 17 pointed in a direction away from the beacon 12. This position of the reference sensor 17 may correspond to the pointing device 14 being rotated to either side, above or below the beacon 12. For illustrative purposes, FIG. 4b can be assumed to be a top planar view, and the pointing device 14 would therefore be pointed to the left of the beacon 12.

Figure 4C:
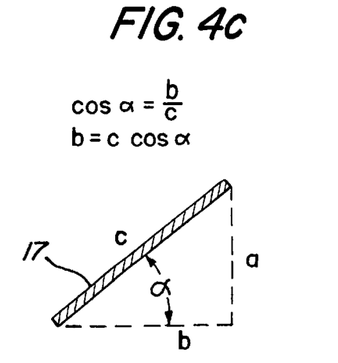

An angle is formed between a line perpendicular to the axis of the beacon 12 and the plane of the reference sensor 17. The angle $\alpha$ is shown in FIG. 4c in a right triangle. The cos of the angle a is equal to the side b over the side c, which is the actual area of the reference sensor 17: Side b represents the effective area of the reference sensor 17 that is exposed to the beacon 12. Thus, side b is equal to the actual area of the reference sensor 17 times the cos of the angle $\alpha$. This relationship can be used to determine the effective area of each sensor that is exposed to the beacon 12 when the positioning controller 14 is rotated.

Figure 5A:
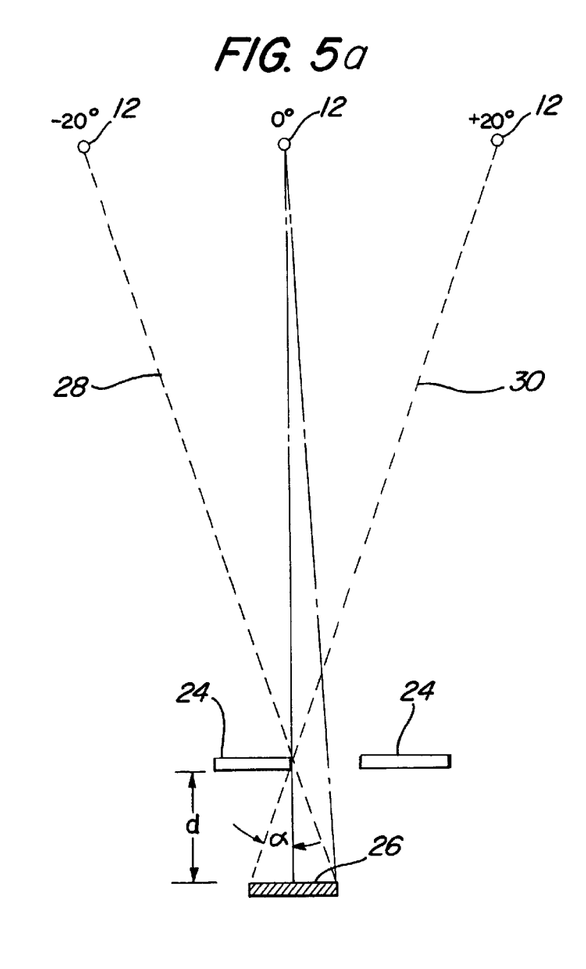
FIGS. 5a and 5b are geometrical diagrams showing how amounts of light received through masks into sensors are calculated.

FIG. 5a illustrates the geometrical arrangement of one of the masked angle sensors. For illustrative purposes, the horizontal angle sensor 26 is shown and will be discussed. The horizontal angle mask 24 covers half of the horizontal angle sensor 26 from reception of infrared light when the horizontal angle sensor 26 is pointed directly at the beacon 12. When the horizontal angle sensor 26 is pointed directly at the beacon 12, the angle $\alpha$ is equal to 0. For purposes of this discussion, it is assumed that the view of the sensor 26 and the beacon 12 in FIG. 5a is a top planar view.

When the horizontal angle sensor 26 is pointed 20 degrees to the right of the beacon 12, the mask 20 blocks all of the light, and there is no illumination on the horizontal angle sensor 26. This configuration is shown by the dotted line 28. When the horizontal angle sensor 26 is pointed 20 degrees to the left of the beacon 12, the light illuminating from the beacon fully illuminates the horizontal angle sensor 26. In this configuration where the beacon 12 is to the right of the sensor (the sensor is pointing to the left of the beacon 12), a dotted line 30 represents the infrared light traveling from the beacon 12 through the horizontal angle mask 24 and onto the horizontal angle sensor 26. While ±20 degrees have been set for full scale in the presently preferred embodiment, other ranges of orientation may also be configured.

Figure 5B:
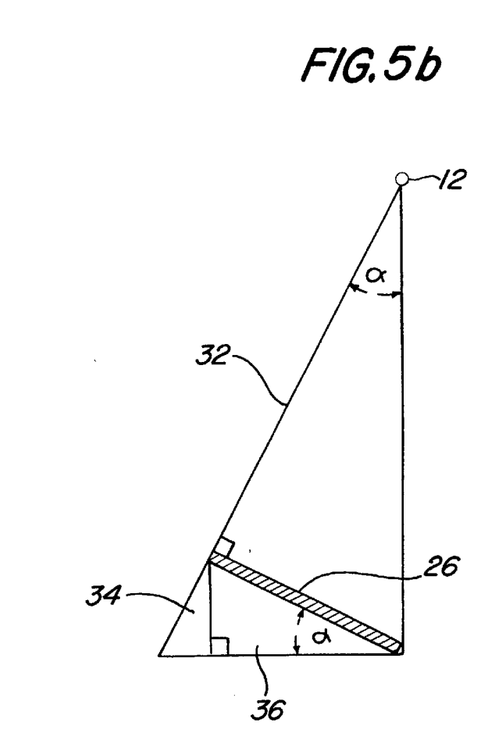

Referring to FIG. 5b, it is noted that the $\alpha$ in FIG. 5a is the same as the $\alpha$ in FIGS. 4a, 4b, and 4c. FIG. 5b shows the angle $\alpha$ of FIG. 5a next to the beacon 12. FIG. 4b also shows the angle of FIGS. 4a, 4b, and 4c just beneath the horizontal angle sensor 26. Using geometric principles, the line 32 can be extended downward beneath the horizontal angle sensor 26 to form a third right triangle 34 having an angle $\alpha$. The angle adjacent to this $\alpha$ angle is equal to 90−$\alpha$, and therefore the other acute angle in this triangular 36 is equal to $\alpha$. This relationship is evident using the rule that the sum of the three angles of triangle 36 must equal 180 degrees.

Turning back to FIG. 5a, since half of the horizontal angle sensor 26 is masked when the sensor is pointing directly at the beacon 12, this half of the horizontal angle sensor 26 must be multiplied by the effective area of the horizontal angle sensor 26. The effective angle of the sensor was derived in FIGS. 4a, 4b, and 4c, and is equal to the actual length of the sensor times cos $\alpha$. In the presently preferred embodiment, each sensor is ¹⁄₁₀-inch, and thus this half of the effective area of the sensor is determined by cos a times one-half of ¹⁄₁₀-inch. In other words, the first half of the effective area of the sensor is equal to 0.05 cos $\alpha$.

After determining the initial area of the horizontal angle sensor 26 that is exposed at a 0-degree orientation relative to the beacon, the amount of illumination that changes due to the angular position of the horizontal angle sensor 26 relative to the beacon 20 must be calculated. The distance between the horizontal angle sensor 26 and the horizontal mask 24 is shown at d in FIG. 5a. Thus, the tangent (tan) of $\alpha$0 is equal to the effective area of the horizontal angle sensor divided by d. The effective area of the sensor that is illuminated when the sensor 26 is not pointed directly at the source is thus equal to d times the tan of $\alpha$.

This effective area increases the net effective area when the horizontal angle sensor 26 is pointed to the left of the beacon 12. In fact, when the beacon forms a 20-degree angle with a line perpendicular to the sensor (the axis), the horizontal angle sensor 26 is fully illuminated.

On the other hand, when the horizontal angle sensor 26 is pointed to the right of the beacon 12, this effective area becomes negative such that the net effective area calculated by $c \cos \alpha$ is attenuated. Accordingly, when the horizontal angle sensor 26 is pointed 20 degrees to the right of the beacon 12, this effective area term completely cancels out the first effective area term and 0% illumination of the horizontal angle sensor 26 occurs.

An equation used to determine the effective area illuminated by the horizontal angle sensor 26 (or the vertical angle sensor 20) is a combination of the two effective areas discussed above. This equation can be represented as $$((\cos \alpha)(d \tan \alpha) - 0.05).$$

The $\cos \alpha$ term represents the effective area calculation without masking. The ($d \tan \alpha$) term represents the exposed area change due to the angle of orientation between the beacon and the sensor, and the −0.05 term represents the initial area exposed at a 0-degree orientation.

It is noted that when the positioning controller 14 is aligned perpendicular to the beacon 12, the outputs of both the horizontal angle sensor 26 and the vertical angle sensor 22 are each 50% of the reference sensor 18. As the angle changes in either axis, more or less of the horizontal angle sensor 26 and the vertical angle sensor 22 will be exposed to the beacon 12.

Referring to Table I below, position data output of the presently preferred embodiment is given in the right-hand column under "Output." The first column is the angle in degrees from a line perpendicular to the sensor. The second column is the angle in radians. The third column is the output of the reference sensor 18 (the actual angle of the sensor is calculated at 1 inch instead of 0.1 inch in this column). The fourth column is the calculated output value for one of the angle sensors 22 and 26. Each item in this column is calculated using the equation $$((\cos \alpha)(0.137 \tan \alpha - 0.05)),$$

where d is equal to 0.137-inch. The fifth column is normalized to the reference data by multiplying times 10. The sixth column is a scaled ratio of the output divided by the reference times 512. The output for each of the vertical angle calculations and the horizontal angle calculations determines the position of the displayed object 16 on the television 10.

TABLE I

| α | Radians | OUTPUT OF REF SENSOR Cos (α) | OUTPUT OF AN ANGLE SENSOR F (α) | Normalized | Output |
|---|---|---|---|---|---|
| 20.00 | 0.3491 | 0.9397 | 0.00013 | 0.00128 | 0 |
| 19.00 | 0.3316 | 0.9455 | 0.00267 | 0.02673 | 14 |
| 18.00 | 0.3142 | 0.9511 | 0.00522 | 0.05218 | 28 |
| 17.00 | 0.2967 | 0.9563 | 0.00776 | 0.0776 | 40 |
| 16.00 | 0.2793 | 0.9613 | 0.0103 | 0.10301 | 54 |
| 15.00 | 0.2618 | 0.9659 | 0.01284 | 0.12838 | 68 |
| 14.00 | 0.2443 | 0.9703 | 0.01537 | 0.15372 | 80 |
| 13.00 | 0.2269 | 0.9744 | 0.0179 | 0.179 | 94 |
| 12.00 | 0.2094 | 0.9781 | 0.02042 | 0.20424 | 106 |

TABLE I-continued

| α | Radians | OUTPUT OF REF SENSOR Cos (α) | OUTPUT OF AN ANGLE SENSOR F (α) | Normalized | Output |
|---|---|---|---|---|---|
| 11.00 | 0.1920 | 0.9816 | 0.02294 | 0.22941 | 118 |
| 10.00 | 0.1745 | 0.9848 | 0.02545 | 0.25451 | 132 |
| 9.00 | 0.1571 | 0.9877 | 0.02795 | 0.27953 | 144 |
| 8.00 | 0.1396 | 0.9903 | 0.03045 | 0.30447 | 156 |
| 7.00 | 0.1222 | 0.9925 | 0.03293 | 0.32931 | 168 |
| 6.00 | 0.1047 | 0.9945 | 0.03541 | 0.35406 | 182 |
| 5.00 | 0.0873 | 0.9962 | 0.03787 | 0.37869 | 194 |
| 4.00 | 0.0698 | 0.9976 | 0.04032 | 0.40322 | 206 |
| 3.00 | 0.0524 | 0.9986 | 0.04276 | 0.42761 | 218 |
| 2.00 | 0.0349 | 0.9994 | 0.04519 | 0.45188 | 230 |
| 1.00 | 0.0175 | 0.9998 | 0.0476 | 0.47601 | 242 |
| 0.00 | 0.0000 | 1.0000 | 0.05 | 0.5 | 256 |
| −1.00 | −0.0175 | 0.9998 | 0.05238 | 0.52383 | 268 |
| −2.00 | −0.0349 | 0.9994 | 0.05475 | 0.54751 | 280 |
| −3.00 | −0.0524 | 0.9986 | 0.0571 | 0.57101 | 292 |
| −4.00 | −0.0698 | 0.9976 | 0.05943 | 0.59435 | 304 |
| −5.00 | −0.0873 | 0.9962 | 0.06175 | 0.6175 | 316 |
| −6.00 | −0.1047 | 0.9945 | 0.06405 | 0.64046 | 328 |
| −7.00 | −0.1222 | 0.9925 | 0.06632 | 0.66323 | 342 |
| −8.00 | −0.1396 | 0.9903 | 0.06858 | 0.6858 | 354 |
| −9.00 | −0.1571 | 0.9877 | 0.07082 | 0.70816 | 366 |
| −10.00 | −0.1745 | 0.9848 | 0.07303 | 0.7303 | 378 |
| −11.00 | −0.1920 | 0.9816 | 0.07522 | 0.75222 | 392 |
| −12.00 | −0.2094 | 0.9781 | 0.07739 | 0.77391 | 404 |
| −13.00 | −0.2269 | 0.9744 | 0.07954 | 0.79537 | 416 |
| −14.00 | −0.2443 | 0.9703 | 0.08166 | 0.81658 | 430 |
| −15.00 | −0.2618 | 0.9659 | 0.08375 | 0.83754 | 442 |
| −16.00 | −0.2793 | 0.9613 | 0.08583 | 0.85825 | 456 |
| −17.00 | −0.2967 | 0.9563 | 0.08787 | 0.8787 | 470 |
| −18.00 | −0.3142 | 0.9511 | 0.08989 | 0.89888 | 482 |
| −19.00 | −0.3316 | 0.9455 | 0.09188 | 0.91879 | 496 |
| −20.00 | −0.3491 | 0.9397 | 0.09384 | 0.93841 | 510 |

Figure 6:
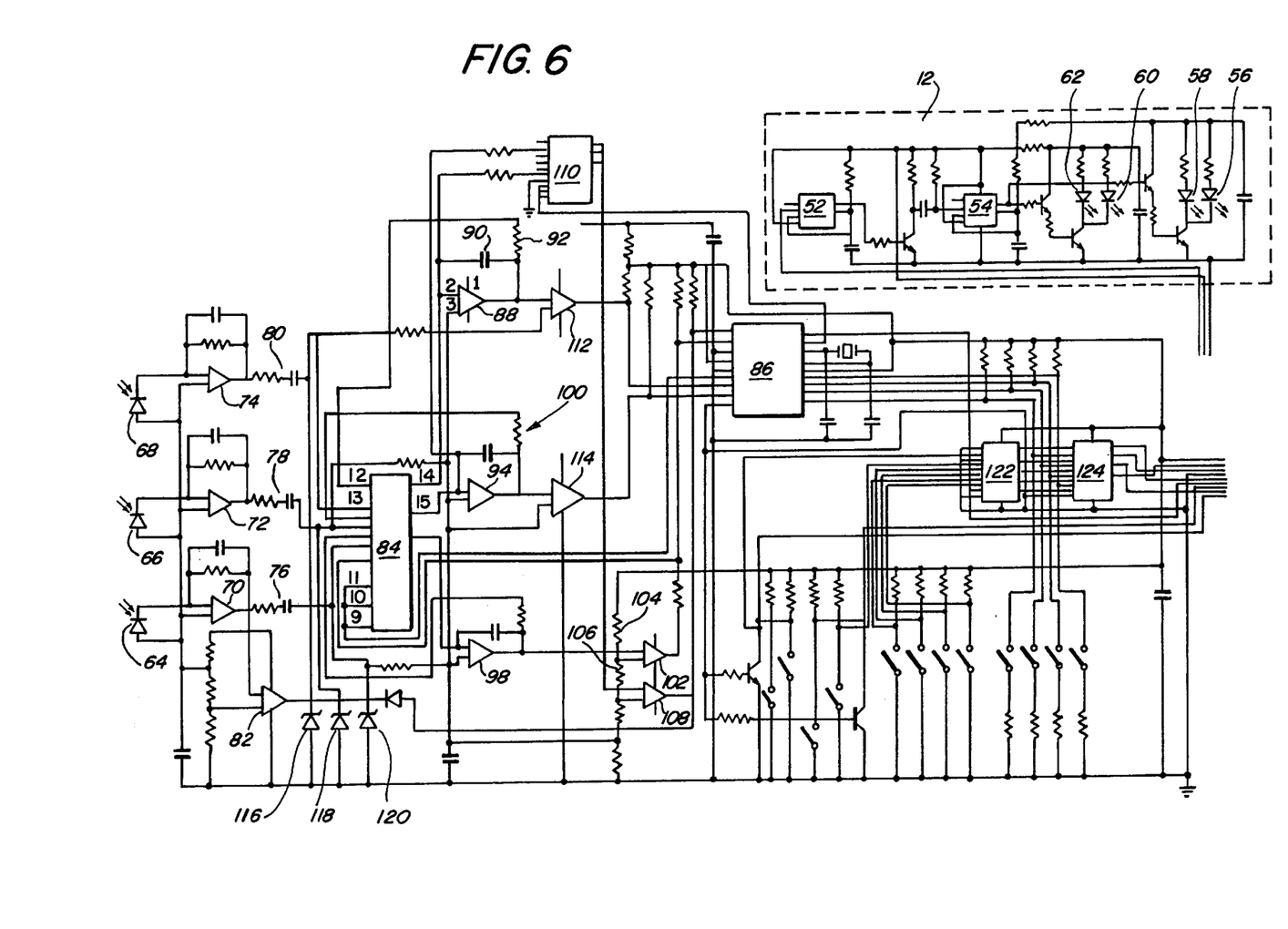
FIG. 6 is a schematic diagram of the circuitry used in the presently preferred embodiment.

Referring to FIG. 6, the beacon 12 includes two timers 52 and 54. The first timer 52 is triggered on a transition of a bit of a gaming system 13 input/output (I/O) port. This occurs once per television field, or at approximately 60 Hertz (Hz) for National Television Standards Committee (NTSC) television signals, which are the United States standard, or 50 Hz for PAL (European Standard). The bit of the I/O port is used by the standard three-button controller and is used to toggle a multiplexer in the standard hand-held Sega controller. The presently preferred embodiment is thus compatible with the normal gaming controller protocol.

The LEDs in the beacon 12 are shown at 56, 58, 60, and 62. The first timer 52 triggers the second timer 54 and then prevents further triggering for 12 milli-seconds. This action is to prevent damage to the four LEDs when the positioning controller 14 is used with certain games that toggle the bit of the I/O port more than once per field. The second timer 54 produces a current pulse of 100 microseconds to the four infrared LEDs 56, 58, 60, and 62. As the length of each current pulse is increased, the error from the mismatch between the television scanning frequency and the 60-Hz power line frequency becomes more difficult to filter. Thus, a pulse length of 100 micro-seconds is used to avoid the necessity of having a bandwidth that includes some of the 120-Hz ripple from standard incandescent lights.

The television 10 scanning frequency is 60 Hz for black-and-white, and is just under 60 Hz for color television sets. That is, the scanning frequency for color television sets is 59.94 Hz. The system thus has an anomaly when used with NTSC color signals when using the vertical blanking interval (VBI). An artifact is caused by the fact that the VBI is at 59.94 Hz instead of 60 Hz. If the background infrared radiation from 60 Hz line frequency powered sources is high, a 120 Hz ripple in the infrared will be produced. If the source is at a different location than the beacon 12, the output data will wander at a 0.12 Hz rate. This produces an 8.333 second period, which is slow enough to be compensated for with movement of the positioning controller 14, but is an error term. If the beacon 12 is triggered at exactly 60 Hz, however, this error term does not exist. Ideally, the source for triggering the beacon 12 would be derived from the 60-Hz line rather than the VBI sink. It is noted that this effect is not present in the PAL system where the line and field frequencies are the same.

An incandescent lamp will generate much more energy than an infrared LED. Thus, it is ideally preferred to have the pulse from the beacon to be as short as possible, but the pulses must contain enough energy for detection by the sensors 17, 20, and 24. A pulse of 100 microseconds is about as long a pulse that can be used without the background noise becoming a significant problem. This pulse width still provides room for filtering. A 50-microsecond pulse would be even better, since a higher cutoff frequency on the filter could be used; but a 50-microsecond pulse would require twice as much energy per pulse. The 100-microsecond pulse width of the presently preferred embodiment runs the LEDs 56, 58, 60, and 62 at about one amp per pulse, which is essentially the rated output of the LEDs. The 50-microsecond pulse width would require a more expensive diode, and could be implemented in alternative embodiments.

The LEDs 56, 58, 60, and 62 are each aimed about 20 degrees off-axis to provide a wide coverage, small area source. At the normal working distances of the system, the beacon can be considered as a point source.

The reference sensor 17, the vertical angle sensor 20, and the horizontal angle sensor 24 comprise three photodiodes 64, 66, and 68, respectively. Each of the three diodes 64, 66, and 68 is connected to an operational amplifier which converts the infrared generated current of the sensor to a voltage. The three operational amplifiers 70, 72, and 74 have the same relative gains.

The three signals are then passed through high-pass filters to remove background infrared signals. The three high-pass filters 76, 78, and 80 comprise resistor-capacitor (RC) filters in the presently preferred embodiment. Each of the RC filters 76, 78, and 80 has a single pole and a cutoff frequency of about 300 Hz. Other filters may be used, such as multipole filters.

The output of the amplifier 70 is fed to a comparator stage 82, which is used to sense an over-range (too large a signal) condition. The over-range condition occurs when the sensors 17, 20, and 24 are less than 1.5 feet from the beacon 12 in the presently preferred embodiment. This over-range condition occurs when the reference operational amplifier 70 is saturated, in which case the integral is no longer valid.

The RC filter outputs are fed to a field effect transistor (FET) switch 84, which is controlled by the microprocessor 86. The FET switch 84 is basically a triple-pole, double-throw switch which has three states. A horizontal angle integrator comprising an operational amplifier 88 and a capacitor 90 is connected to the FET switch 84. During the quiescent state before a pulse, the FET switch 84 has the resistor 92 connected across the integrating capacitor 90. In this state, pin 12 of the FET switch 84 is connected to pin 14 of the FET switch 84, and the integrator is reset wherein the output of pin 1 of the operational amplifier 88 has the same potential as pins 2 and 3 of the operational amplifier 88.

When the FET switch 84 is triggered by a pulse, pin 14 is switched from pin 12 to pin 13 of the FET switch 84. In this state, the horizontal angle sensor 24 input is integrated for that channel.

The vertical angle integrator includes operational amplifier 94, and the reference angle integrator includes operational amplifier 98. For the reference operational amplifier 98, the switches are all run simultaneously because pins 9, 10, and 11 of the FET switch 84 are all tied together. When the reference operational amplifier 98 receives a pulse, the FET switch 84 disconnects the reset resistor 100 and connects the input to the reference operational amplifier 98.

The reference operational amplifier 98 signal is integrated until either the reference output exceeds the threshold comparator 102 threshold or 100 microseconds have passed, whichever occurs first. Looking at this reference channel, when the output of the reference integrator 88 equals the threshold set by 104 and 106, the FET switch 84 is directed to open to turn off all of the integrators. Alternatively, if 100 microseconds have passed, then the FET switch 84 will similarly open.

Thus, integration occurs until a threshold level is met or until a predetermined time has expired. The 40-to-1 dynamic range of the presently preferred embodiment is obtained by integrating until a certain voltage is met. This may take 10 microseconds or 100 microseconds, which yields a 10-to-1 dynamic range. At the end of the 100 microseconds (assuming the maximum threshold was not met) a second determination is made as to whether a minimum threshold has been met, which yields about a 4-to-1 range for a total of a 40-to-1 range. So if the output of the operational amplifier 88 has not met the minimum threshold (the 108 output), an under-range condition is flagged and the data is not used. An under-range condition may occur, for example, when the positioning controller 14 is more than eight feet away from the beacon 12. If the output exceeds the minimum threshold but does not meets the maximum threshold, the data is used.

As the desired result is the ratio of the reference channel to each of the horizontal and vertical angle channels, the output of the reference integrator is connected to the horizontal and vertical integrators through the downramp switch 110. The time required to return the integrator outputs to zero (as sensed by comparators 112 and 114) is equal to the ratio of the unknown angle inputs and the reference. When both outputs have reached zero the position data (binary form of 0 to 511) is stored and the integrators are reset.

The function of the downramp switch 110 will now be described in further detail. The downramp switch 110 performs an analog-to-digital conversion using a dual slope integration technique. According to this technique, an unknown is integrated for a fixed period of time, and then a known is used to determine the time required to deintegrate it (integrate it in the opposite direction back to zero). Thus, the first slope of the dual slope integration involves integrating the unknown where integration occurs to a preset value. For example, a reference signal between the maximum and the minimum thresholds will be integrated for 100 microseconds (a fixed period). Since the desired result is the ratio of the two voltages (the reference to the vertical, for example) instead of the absolute value of the two voltages, the reference voltage is used as the downramp reference. This essentially divides the one voltage by the other. Basically, the conversion is the amount of time required to integrate back to zero from the unknown condition. Full scale occurs when the unknown is equal to the reference.

The microprocessor 86 is used to control timing for the analog-to-digital conversion and format the data for transmission to the gaming unit 15. The data is formatted into four-bit nibbles and transmitted under control of the gaming 15 in nine states. The micro-processor 86 of the presently preferred embodiment can be replaced with simple timing and control logic in an alternative integrated solution.

Incidentally, when the integrator switches in the FET switch 84 are turned off, the three Schotky Diodes 116, 118, and 120 serve as clamping diodes for the respective integrating capacitors. These clamping diodes prevent the switches from being reverse biased.

Two multiplexers 122 and 124 are used to combine the position information and the normal controller switches into the gaming format. This allows all of the normal switch inputs to be available to the game, as well as position information. This also allows the positioning controller 14 to emulate the standard three-button controller when it is used with a game not programmed to use the additional capabilities of this controller.

In the presently preferred embodiment, a vertical blanking interrupt interval (VBI) interrupt is used for interrogation to interrupt the gaming software with position data. Specifically, the positioning controller 14 of the present invention is interrogated by gaming to provide data indicating which buttons of the positioning controller 14 are pressed and the current X and Y position data. This produces a minimum of interference from infrared sources other than the beacon 12, since the screen is off (not scanned) at this point in time.

In operation, the positioning controller 14 of the presently preferred embodiment is plugged into the Control 1 port (left DB9) of the gaming system 15. A second positioning controller 14 (not shown) can also be used. The second positioning controller 14 would be plugged into the Control 2 port of the gaming system 15. Only one beacon 12 is required, regardless of the number of positioning controllers 14 used. The beacon 12 is placed next to the television 10, with the emitting side of the beacon 12 pointed at the user. A cartridge can then be inserted into the gaming system 15, and regular operation may be commenced.

Figure 7A:
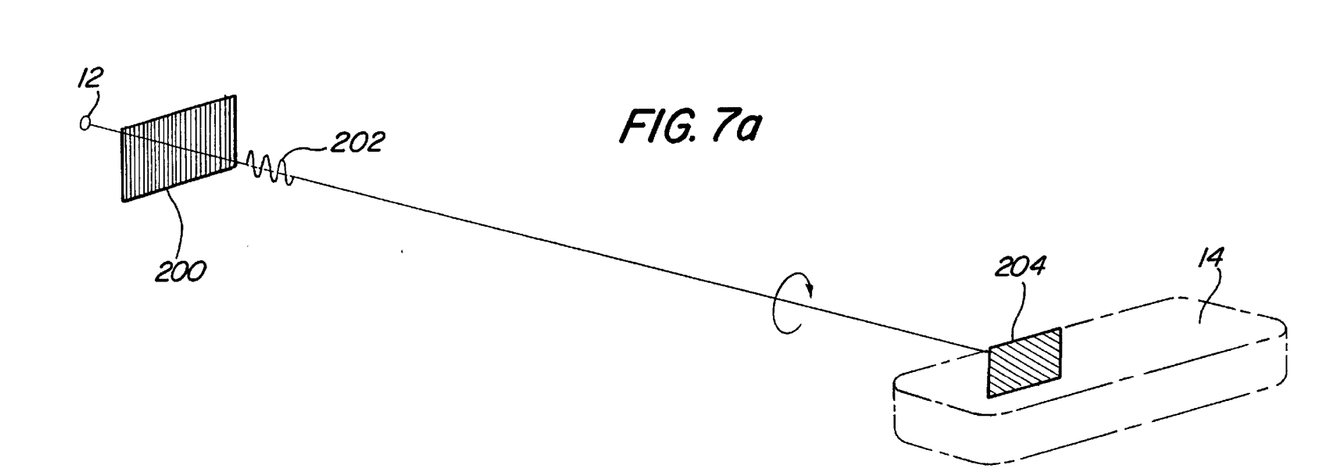

In an alternative embodiment, an additional channel is added to the positioning controller 14 to allow for detection of the orientation of the positioning controller 14 about a roll axis. Infrared light from the beacon 12 comprising an LED is passed through a first polarized filter 200. The first polarized filter 200 may comprise a polarized lens. The first polarized filter 200 passes only vertically-polarized infrared light, as presently preferred. That is, the electric lines of flux of the infrared light are vertically oriented and have a first magnitude, as shown at 202.

The vertically-polarized light is received through the second polarized filter 204, which is also a polarized lens. The first polarized filter 200 and the second polarized filter 204 may comprise other means for polarizing light instead of polarized lenses. The second polarized filter 204 is oriented at a 45-degree angle relative to the first polarized filter 200. Thus, only half of the vertically-polarized light 202 can pass through the second polarized filter 204. Accordingly, a 50% signal level, as shown at 206, can be detected by a photodiode (not shown) within the positioning controller 14. The reception of a 50% signal indicates that the positioning controller 14 is positioned in a horizontal plane.

Figures 2, 7C:
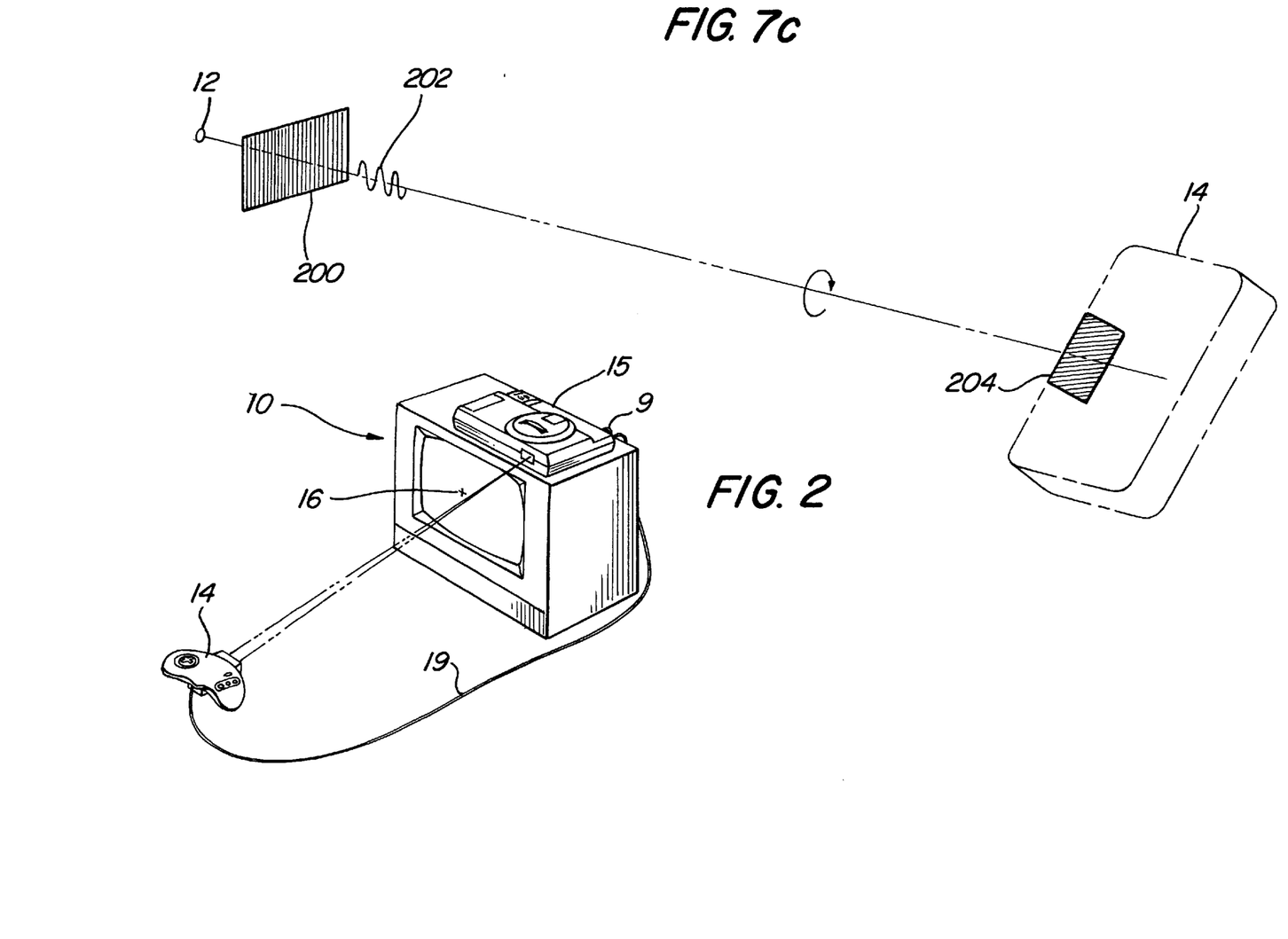
FIG. 2 is a perspective view of the positioning controller connected to the gaming device according to the alternative embodiment.
FIGS. 7a, 7b, and 7c are perspective views of an alternative embodiment of the present invention.
Figure 7B:
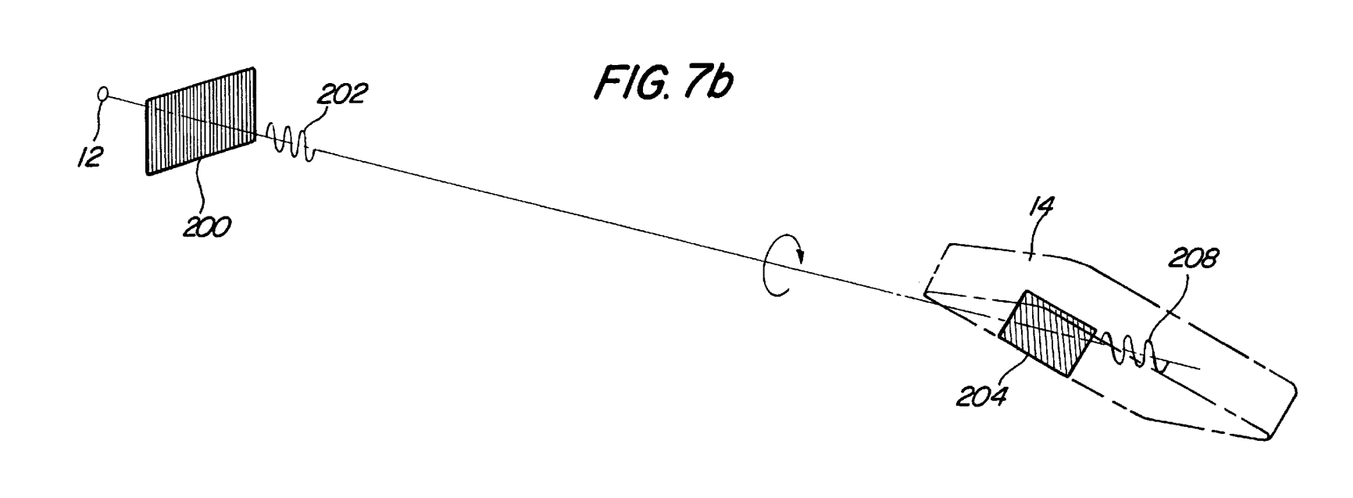

In FIG. 7b, all of the vertically-polarized light 202 passes through the second polarized filter 204 when the positioning controller 14 is rotated 45 degrees to the right. The second polarized filter 204 is vertically aligned relative to the first polarized filter 200 when the second polarized filter 204 is rotated 45 degrees to the right. Thus, a maximum signal 208 can be detected by a photodiode within the positioning controller 14. FIG. 7c shows that when the positioning controller 14 is rotated 45 degrees to the left, the second polarized filter 204 is perpendicularly oriented relative to the first polarized filter 200. Thus, no light is transmitted through the second polarized filter 204 and a zero signal is received by the photodiode within the positioning controller 14. Between the three positions shown in FIGS. 7a, 7b, and 7c are a number of intermediate roll orientations that can be assumed by the positioning controller 14 and detected by detecting circuitry.

This alternative embodiment can be used in combination with the presently preferred embodiment, or can be used independently thereof. The polarizing of the beacon 12 by the first polarized filter 200 does not affect the operation of the vertical angle or horizontal angle channels, but significantly more power is required at the beacon 12 to compensate for the filter loss. Additionally, the positioning controller 14 has an additional sensor placed behind the second polarized filter 204, and the horizontal angle, vertical angle, and reference sensors do not need to be moved on the positioning controller 14. Thus, according to this alternative embodiment, the second polarized filter 204 is rotated with respect to the first polarized filter 200 when the positioning controller 14 is in a horizontal plane. As the positioning controller 14 is rotated about the roll axis, the intensity of the infrared light increases as the first and second polarized filters 200 and 204 approach a zero-degree differential angle. As the controller is rotated in the other direction about the roll axis, the intensity of the infrared light decreases as the first and second polarized filters 200 and 204 approach a perpendicular orientation relative to one another. The signals can be scaled to reflect smaller angular displacements, according to preference.

The first and second polarized filters 200 and 204 can be configured to have varying transmission and blocking characteristics. These filters may also contain additional off-axis transmission losses which are not described in the cosine area equations discussed above in the presently preferred embodiment. These differences, however, can be mathematically corrected based on the inputs from the horizontal angle and vertical angle inputs.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus for monitoring an orientation of a positioning controller relative to an external infrared light source, comprising:

a first photodiode located on the positioning controller for receiving a first portion of infrared light from the external infrared light source;

a second photodiode located on the positioning controller for receiving a second portion of infrared light from the external light source equal to or less than the first portion of infrared light received by the first photodiode; and circuitry for determining an orientation of the positioning controller using the first and second portions of received infrared light and for thereby determining the orientation of the positioning controller relative to the external infrared light source.

2. The apparatus of claim 1, the first photodiode having a parameter thereof masked to limit detection of light beyond a certain angle of orientation of the pointing device measured from a perpendicular axis.

3. The apparatus of claim 2, the second photodiode having a portion thereof masked to limit reception of light on a first side of a plane bisecting the second photodiode, and to promote reception of light on a second side of the plane.

4. The apparatus of claim 2, further including a third photodiode for receiving a third portion of infrared light from the infrared light source.

5. The apparatus of claim 4, the circuitry using the first, second, and third portions of received light for determining the orientation of the positioning controller relative to the infrared light source.

6. The apparatus of claim 5, the circuitry determining the pitch and the yaw of the pointing device relative to the infrared light source.

7. The apparatus of claim 6, the second photodiode having a portion thereof masked to limit reception of light on a first side of a first plane bisecting the second photodiode, and to promote reception of light on a second side of the first plane.

8. The apparatus of claim 7, the third photodiode having a portion thereof masked to limit reception of light on a first side of a second plane bisecting the second photodiode, and to promote reception of light on a second side of the second plane.

9. The apparatus of claim 8, wherein the upper half of the second photodiode is masked so that reception of light into the second photodiode is limited when the second photodiode is pointed below the infrared light source and the reception of light into the second photodiode is promoted when the second photodiode is pointed above the infrared light source.

10. The apparatus of claim 9, wherein the left half of the third photodiode is masked so that reception of light into the third photodiode is limited when the third photodiode is pointed to the right of the infrared light source and the reception of light into the third photodiode is promoted when the third photodiode is pointed to the left of the infrared light source.

11. A positioning controller having a receiving side for receiving light from a light source, the receiving side including an axis extending perpendicularly therefrom, and a vertical plane and a horizontal plane intersecting at the axis, the positioning controller comprising:
    a reference sensor for receiving light from the source, the reference sensor being masked to receive light within a predetermined range of acute angles measured from the axis; and
    an angle sensor for receiving light from the source, the angle sensor being masked to receive a larger quantity of light from a first side of one of the horizontal plane and the vertical plane than from a second side of the same plane, wherein the light received by the angle sensor is equal to or less than the light received by the reference sensor.

12. The positioning controller of claim 11, wherein the angle sensor is a vertical angle sensor that is masked to receive a larger quantity of light from a first side of the horizontal plane than from a second side of the horizontal plane.

13. The positioning controller of claim 11, wherein the angle sensor is a horizontal angle sensor that is masked to receive a larger quantity of light from a first side of the vertical plane than from a second side of the vertical plane.

14. The positioning controller of claim 12, further including a horizontal angle sensor for receiving light from the source, the horizontal angle sensor being masked to receive a larger quantity of light from a first side of the vertical plane than from a second side of the vertical plane.

15. The apparatus of claim 14, further including circuitry for determining an orientation of the positioning controller using amounts of light received by the reference sensor, the vertical angle sensor, and the horizontal angle sensor.

16. The apparatus of claim 15, wherein the circuitry determines the orientation of the positioning controller relative to the light source.

17. The apparatus of claim 16, wherein the light source is an infrared light source.

18. The apparatus of claim 16, the circuitry determining the pitch and the yaw of the pointing device relative to the light source.

19. The apparatus of claim 18, wherein the lower half of the vertical angle sensor is masked so that reception of light into the vertical angle sensor is limited when the vertical angle sensor is pointed above the light source and the reception of light into the vertical angle sensor is promoted when the vertical angle sensor is pointed below the light source.

20. The apparatus of claim 19, wherein the right half of the horizontal angle sensor is masked so that reception of light into the horizontal angle sensor is limited when the horizontal angle sensor is pointed to the left of the light source and the reception of light into the horizontal angle sensor is promoted when the horizontal angle sensor is pointed to the right of the light source.

21. An apparatus for changing a position of a displayed object on a screen in response to a change in orientation of a positioning controller, comprising:
    means for transmitting a reference signal to the positioning controller;
    means operatively connected to the positioning controller for receiving the reference signal;
    means operatively connected to the positioning controller for separately receiving a portion of the reference signal;
    means operatively connected to the positioning controller for determining a direction from which the reference signal and the portion of the reference signal were received and for outputting data indicative of an orientation of the positioning controller; and
    means for receiving the orientation data and for displaying the object on the screen, the position of the object corresponding to the orientation of the positioning controller.

22. A system for monitoring the roll orientation of a positioning controller, comprising:
    a source of polarized light;
    a receiver located on the positioning controller having a polarized filter, the receiver receiving the polarized light through the polarized filter;
    a single photodiode within the receiver for receiving the light from the polarized filter; and
    circuitry for determining the roll orientation of the positioning controller by determining the relative amount of light received by the single photodiode.

23. The system of claim 22, wherein the source of polarized light has a first polarized filter and the polarized filter of the receiver is a second polarized filter.

24. The system of claim 23, wherein the first and second polarized filters are polarized lenses.

25. The system of claim 24, wherein the orientation of the first polarized filter is different than the orientation of the second polarized filter.

26. The system of claim 25, wherein the first polarized filter passes polarized light from the source at a different angle relative to the second polarized filter.

27. The system of claim 26, wherein the circuitry determines the roll orientation of the positioning controller by determining the percentage of light that passes through the first and second polarized filters.

28. The system of claim 27, wherein the circuitry determines that the positioning controller is positioned in a horizontal plane when 50% of light from the source is received by the photodiode, determines that the positioning controller is positioned at a first predetermined degree roll in a first direction from the horizontal plane when the photodiode receives a predetermined maximum amount of light, and determines that the positioning controller is positioned at a second predetermined degree roll in a second direction from the horizontal plane when the photodiode receives a predetermined minimum amount of light.

29. The system of claim 28, wherein the first predetermined degree roll is 45 degrees in the first direction from the horizontal plane and the second predetermined degree roll is 45 degrees in the second direction from the horizontal plane.

30. A method of obtaining a large range of operable distances between a positioning controller and a display, the positioning controller including a reference sensor and an angle-detecting sensor, the method comprising the following steps:

transmitting infrared light from a beacon located near the display;

receiving the transmitted light into the reference sensor and the angle-detecting sensor, each of the reference sensor and the angle-detecting sensor generating an output proportional to the amount of light received therein;

integrating the output of the reference sensor and the output of the angle-detecting sensor for a predetermined amount of time, each of the two integrals representing respective accumulations of output over the predetermined amount of time;

comparing the two accumulations; and determining an orientation of the positioning controller based on the comparison.

31. The method of obtaining a large range of operable distances of claim 30, the step of integrating the output of the reference sensor and the output of the angle-detecting sensor comprising the following steps:

(a) making a first determination of whether a predetermined maximum amount of light has been received into the reference sensor, the first determination being made by comparing the accumulation of the reference sensor output with a predetermined threshold;
  (1) discontinuing integration of the outputs of the reference sensor and the angle-detecting sensor, if the predetermined maximum amount of light has been received; and
  (2) continuing to integrate the outputs of the reference sensor and the angle-detecting sensor, if the predetermined maximum amount of light has not been received; and (b) making a second determination of whether a predetermined amount of time has passed from a time that the integrations began, if the predetermined maximum amount of light has not been received;
  (1) discontinuing integration of the outputs of the reference sensor and the angle-detecting sensor, if the predetermined maximum amount of time has passed; and
  (2) continuing to integrate the outputs of the reference sensor and the angle-detecting sensor, if the predetermined maximum amount of time has not passed.

32. The method of obtaining a large range of operable distances of claim 30, the step of transmitting infrared light from a beacon including transmitting infrared light from a beacon within a gaming device located near the display.

33. An apparatus for monitoring an orientation of a positioning controller relative to an external infrared light source, comprising:

a first photodiode located on the positioning controller for receiving a reference signal of infrared light from the external infrared light source;

a second photodiode located on the positioning controller for receiving a first portion the reference signal received by the first photodiode;

a third photodiode located on the positioning controller for receiving a second portion the reference signal received by the first photodiode; and circuitry for determining an orientation of the positioning controller using the received reference signal, the received first portion of the reference signal, and the received second portion of the reference signal and for thereby determining the orientation of the positioning controller relative to the external infrared light source.

34. An apparatus for monitoring an orientation of a positioning controller relative to a remote infrared light source located externally from the positioning controller, comprising:

a plurality of sensors located on the positioning controller for each receiving a respective portion of infrared light transmitted in the direction of the positioning controller from a single external infrared light source;

wherein said plurality of sensors includes:
  a first sensor for receiving a reference signal of infrared light from the external infrared light source,
  a second sensor for receiving a first portion the reference signal received by the first sensor, and
  a third sensor for receiving a second portion the reference signal received by the first sensor; and circuitry for determining an orientation of the positioning controller using the received reference signal, the received first portion of the reference signal, and the received second portion of the reference signal and for thereby determining the orientation of the positioning controller relative to the external infrared light source.

* * * * *